US010893038B2

(12) United States Patent
Kelsey

(10) Patent No.: US 10,893,038 B2
(45) Date of Patent: Jan. 12, 2021

(54) ATTRIBUTED NETWORK ENABLED BY SEARCH AND RETRIEVAL OF PRIVITY DATA FROM A REGISTRY AND PACKAGING OF THE PRIVITY DATA INTO A DIGITAL REGISTRATION CERTIFICATE FOR ATTRIBUTING THE DATA OF THE ATTRIBUTED NETWORK

(71) Applicant: Herb Kelsey, Wall Township, NJ (US)

(72) Inventor: Herb Kelsey, Wall Township, NJ (US)

(73) Assignee: Cognitive Strategies, LLC, Wilmington, DE (US)

(*) Notice: Subject to any disclaimer, the term of this patent is extended or adjusted under 35 U.S.C. 154(b) by 108 days.

(21) Appl. No.: 15/701,159

(22) Filed: Sep. 11, 2017

(65) Prior Publication Data

US 2018/0077147 A1    Mar. 15, 2018

Related U.S. Application Data

(60) Provisional application No. 62/394,652, filed on Sep. 14, 2016.

(51) Int. Cl.
*H04L 29/06* (2006.01)
*H04L 9/32* (2006.01)

(52) U.S. Cl.
CPC ........ *H04L 63/0823* (2013.01); *H04L 9/3231* (2013.01); *H04L 9/3263* (2013.01); *H04L 63/04* (2013.01); *H04L 63/0428* (2013.01); *H04L 63/0861* (2013.01); *H04L 63/126* (2013.01)

(58) Field of Classification Search
CPC ............. H04L 63/0823; H04L 9/3231; H04L 63/0428; H04L 63/126; H04L 63/0861; H04L 9/3263; H04L 63/04
See application file for complete search history.

(56) References Cited

U.S. PATENT DOCUMENTS

| 6,219,439 | B1 | 4/2001 | Burger | |
|---|---|---|---|---|
| 7,987,368 | B2* | 7/2011 | Zhu | H04L 63/0407 713/156 |
| 2003/0058853 | A1* | 3/2003 | Gorbatov | H04L 29/12367 370/389 |
| 2005/0228998 | A1* | 10/2005 | Chan | H04L 9/3268 713/175 |

(Continued)

*Primary Examiner* — Mohammed Waliullah
(74) *Attorney, Agent, or Firm* — Fish & Richardson P.C.

(57) ABSTRACT

Methods and systems generate an attributed network for tracing transmitted data that is attributable to a user. A digital registration certificate includes an identity marker and a verified privity marker. The digital registration certificate is registered with an immutable entry in a registry, with the immutable entry also storing the identity marker and referencing the verified privity marker, and with retrieval of the digital registration certificate being required to access the attributed network. A client device requests to access the attributed network, and the systems and methods authenticate a user of the client device by verifying biometric login data as matching the identity marker included in the immutable entry in the registry. The digital registration certificate is obtained from the registry. A virtual browser configured for accessing the attributed network packages the digital registration certificate with data specified by the client device.

20 Claims, 8 Drawing Sheets

(56) References Cited

U.S. PATENT DOCUMENTS

| | | | |
|---|---|---|---|
| 2007/0094509 A1* | 4/2007 | Wei | H04L 9/3231 |
| | | | 713/176 |
| 2016/0142404 A1* | 5/2016 | Popovich | H04L 63/0815 |
| | | | 726/7 |
| 2017/0054566 A1* | 2/2017 | Nitschke | H04L 9/3268 |
| 2017/0078299 A1* | 3/2017 | Castinado | H04L 63/102 |
| 2017/0255805 A1* | 9/2017 | Ebrahimi | G09C 5/00 |
| 2017/0318014 A1* | 11/2017 | Korus | H04L 63/0861 |
| 2017/0357522 A1* | 12/2017 | Bower, III | H04L 9/3247 |
| 2018/0019994 A1* | 1/2018 | Chang | G06F 21/32 |

\* cited by examiner

ATTRIBUTED NETWORK ENABLED BY SEARCH AND RETRIEVAL OF PRIVITY DATA FROM A REGISTRY AND PACKAGING OF THE PRIVITY DATA INTO A DIGITAL REGISTRATION CERTIFICATE FOR ATTRIBUTING THE DATA OF THE ATTRIBUTED NETWORK

CLAIM OF PRIORITY

This application claims priority under 35 U.S.C. § 119(e) to U.S. Patent Application Ser. No. 62/394,652, filed on Sep. 14, 2016, the entire contents of which are hereby incorporated by reference.

TECHNICAL FIELD

The present application relates to network-ready computer-implemented methods, computer systems and computer-readable mediums for packaging of identity markers with privity markers into digital certificates in an attributed network for attributing packetized data and requests to a user and for searching a data registry for one or more entries storing specified content to authenticate packetized data on an attributed network.

BACKGROUND

Data can be sent over online networks, such as the internet. These data are anonymous, meaning that the person responsible for that data cannot be identified directly. In some cases, a device or system that sent, generated, or modified the data can be identified.

SUMMARY

This document describes systems and processes for building and maintaining an attributed network. The attributed network includes a network configured for exchanging data between users, such as the Internet. A user of the network can attribute the data being exchanged to the sender of the data himself, rather than to a device or account representing the user. The attributed network thus establishes privity between users that exchange data over the attributed network because data attributed to a user of the attributed network cannot be repudiated by the user.

The systems and processes for the attributed network include several advantages. As privity is a pillar of contract law, the attributed network establishes standing for both internet content producers and consumers so either can enforce a promise or a warranty over the attributed network. Online transactions, statements, and other content are attributable directly to users in the attributed network rather than to devices of users of the attributed network. Content of the attributed network cannot be repudiated by the user attributed to the transactions, statements, or other content of the attributed network. The attributed network achieves trust through the transparency of attribution and the information assurance of non-repudiation, and enables users of the attributed network to materially rely on data being received as being non-fraudulent. Users are able to identify a user that is the source of content received over the attributed network and block any additional content from that user, such as if the user is a bad actor, fraudster, etc. The ability to block users, rather than devices associated with users, can reduce an amount of undesirable content on the attributed network and can incentivize good behavior by users of the attributed network, reducing a need for other forms of cybersecurity.

The systems and processes of the attributed network remove anonymity when using the networks (e.g., the internet) to exchange information or perform transactions where value is exchanged. A party to an online transaction over the attributed network can enforce an agreement without another party to the transaction being able to repudiate its agreement.

The systems and processes of the attributed network can create an online environment where data on the attributed network is owned by or assigned to at least one user who is responsible for that data. This is different from current online networks (e.g., the Internet), where data is anonymized with respect to users and wherein users can repudiate that the users themselves are responsible for data or a party to a transaction over the network.

Conventional online networks (such as the internet) are anonymous and do not include mechanisms for establishing privity between users of those networks. While a user's device can be attributed to data, the user himself is not. A user can thus repudiate transactions conducted in his name over the internet. Users cannot prove that this repudiation has merit, and typically assume that claims of fraud by other users over the internet are valid. For example, a user may claim that someone stole her credit card, and the credit card company typically voids the transactions under question, as such transactions cannot be shown to have been genuine. Attributing data to users, rather than to their devices, presents a technical challenge because an identifier that establishes privity between users is not available.

The attributed network attributes the data of the network directly to users, establishing privity with a digital registration certificate that has been generated through a human-witnessed process, and thus cannot be repudiated by the user it represents.

Data on the attributed network are packaged with the digital registration certificate, which establishes the identity of the entity responsible for the data using the human-witnessed process. When conducted offline, these interactions have privity because they are human-witnessed and cannot be repudiated. The attribution of data to entities on the attributed network enables online interactions that have privity between entities. The attribution of data to entities on the attributed network enables online interactions between entities that have non-repudiation by the entities. The attributed network enables enforcement of online transactions and interactions using the rules and regulations hitherto applied to offline interactions by attributing data to entities on the network with a digital registration certificate that includes a privity marker and immutably storing the digital registration certificate in a registry. Attributing data to entities with such a digital registration certificate on an online network represents a fundamental change in how online data are exchanged between entities.

The attributed network reduces bandwidth usage over online networks. The attributed network prevents data that is not attributed from being transmitted over the network. The attributed network thus reduces and/or eliminates network traffic (relative to an amount of network traffic without the attributed network) from botnets, which can be a large source of spam over conventional networks, because automated spam cannot be attributed to a user and thus is not permitted on the attributed network. The attributed network can block users from sending data, e.g., based on past bad behavior. Thus, the attributed network can reduce spam from human users as well.

The attributed network increases network security, relative to an amount of network security without the attributed internet. Since data on the attributed network are attributed to users or other entities, illicit online behavior can be tracked to a responsible party, discouraging future illicit behavior or removing users that conduct illicit behavior from the network. Furthermore, the attributed network can include device verification, reducing the number of compromised devices that are connected to the attributed network. For example, illicit behavior such as piracy of copyrighted content can be attributed to a particular user, rather than a user's device via an IP address or MAC address, and the user cannot repudiate this attribution of illicit activities to him or her directly.

The attributed network includes methods for controlling access to content by using centrally held accounts with different permissions. The attributed network includes a technical feature of network technology in a filtering system by associating individual accounts with their own filtering scheme and elements while locating the filtering system on the systems of the attributed network. Users can be blocked from reaching particular other users over the attributed network. Since the user is blocked, rather than a device or account, the user cannot bypass these restrictions. As such, the attributed network overcomes limitations of the conventional Internet architecture preventing entities from being directly responsible for their data by attributing the data of these entities to the entities themselves using a digital registration certificate generated via a human-witnessed process and thus establishing privity between those entities and the users that received the entities' attributed data. By making the internet more dynamic and efficient, the methods and systems of the attributed network are an improvement to the performance of computer systems themselves.

Applications of the attributed network can include but are not limited to industrial Internet of Things (IOT), consumer IOT, autonomous vehicles, connected car, autonomous aerospace, reducing online transaction fraud, reducing online advertising fraud, mitigating insider threat produced fraud, securing managed APIs to support regulations such as PSD2, and attributing transactions for development operations (DevOps).

The methods and systems for the attributed network include generating a digital registration certificate by packaging an identity marker with a verified privity marker; registering the digital registration certificate in a registry by generating an immutable entry in the registry, with the generated immutable entry storing the digital registration certificate and representing initial registration of the digital registration certificate, with the immutable entry further storing the identity marker and referencing the verified privity marker, and with retrieval of the digital registration certificate being required to access the attributed network; receiving, from a client device, a request to access the attributed network, the request including biometric login data; authenticating a user of the client device by verifying the biometric login data as matching the identity marker included in the immutable entry in the registry; responsive to authenticating, obtaining the digital registration certificate from the registry; causing packaging, by a virtual browser configured for accessing the attributed network, of the digital registration certificate with data specified by a client device of a user; following transmission of the data packaged with the digital registration certificate by the virtual browser of the attributed network, receiving a request to verify that the data transmitted from the client device is attributable to the user, with the request including the digital registration certificate; responsive to the request, retrieving, based on the digital registration certificate, the verified privity marker that is referenced by the generated immutable entry; and verifying attribution of the verified privity marker to the user.

In some implementations, the operations of systems of the attributed network include encrypting the packaged data; and transmitting the encrypted, packaged data over the attributed network.

In some implementations, the verified privity marker includes a biometric identifier, and verification of the verified privity marker includes notarization of the biometric identifier.

In some implementations, the virtual browser comprises an interface for accessing the attributed network, the interface configured to cause one or more processors of the client device to perform operations including: verifying, in response to receiving data from one or more devices via the attributed network, a digital registration certificate associated with the data; in response to a failed verification of the digital registration certificate associated with the data, preventing the data from being accessed by one or more systems of the client device; in response to a successful verification of the digital registration certificate associated with the data, allowing the data to be accessed by the one or more systems of the client device.

In some implementations, the operations of systems of the attributed network include receiving, from the client device, a request to access the attributed network, the request including system image data representing a status of the client device; authenticating the client device by verifying the system image data as matching a verified system image included in an immutable entry in the registry; responsive to authenticating the client device and the user, obtaining the digital registration certificate from the registry.

In some implementations, the verified system image data includes data indicative of one or both of a pre-approved software configuration of the client device or a hardware configuration of the client device.

In some implementations, the operations of systems of the attributed network include, responsive to a failed authentication of the client device, causing the client device to revert to a pre-approved software configuration.

In some implementations, the virtual browser is configured to package the digital registration certificate with data specified by a client device of the user at an application layer of a network protocol for transmission over the attributed network.

In some implementations, the generated immutable entry storing the digital registration certificate comprises a block chain entry. In some implementations, the generated immutable entry storing the digital registration certificate includes a timestamp and a cryptographic hash.

In some implementations, the client device comprises an embedded biometric attribution system, and where the virtual browser is configured to verify a biometric identifier of the embedded biometric attribution system in response to receiving the request to access the attributed network. In some implementations, the embedded biometric attribution system comprises a SIM card, the SIM card being associated with the biometric identifier. In some implementations, the virtual browser verifies the biometric identifier of the embedded biometric attribution system independent of an operating system of the client device. In some implementations, the virtual browser includes a website. In some implementations, the virtual browser comprises a browser modification.

In some implementations, the biometric data represents inherent biometric data of a user. In some implementations, the biometric data represents behavioral biometric data of the user.

In some implementations, a user is an administrative user, and the verified privity marker includes a verification by another administrative user. In some implementations, a user is an administrative or otherwise privileged user, and verifying attribution of the verified privity marker to the user comprises increasing a threshold of verification before verifying the attribution using the increased threshold. In some implementations, the operations of systems of the attributed network include periodically requesting verification of biometric data of the user.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
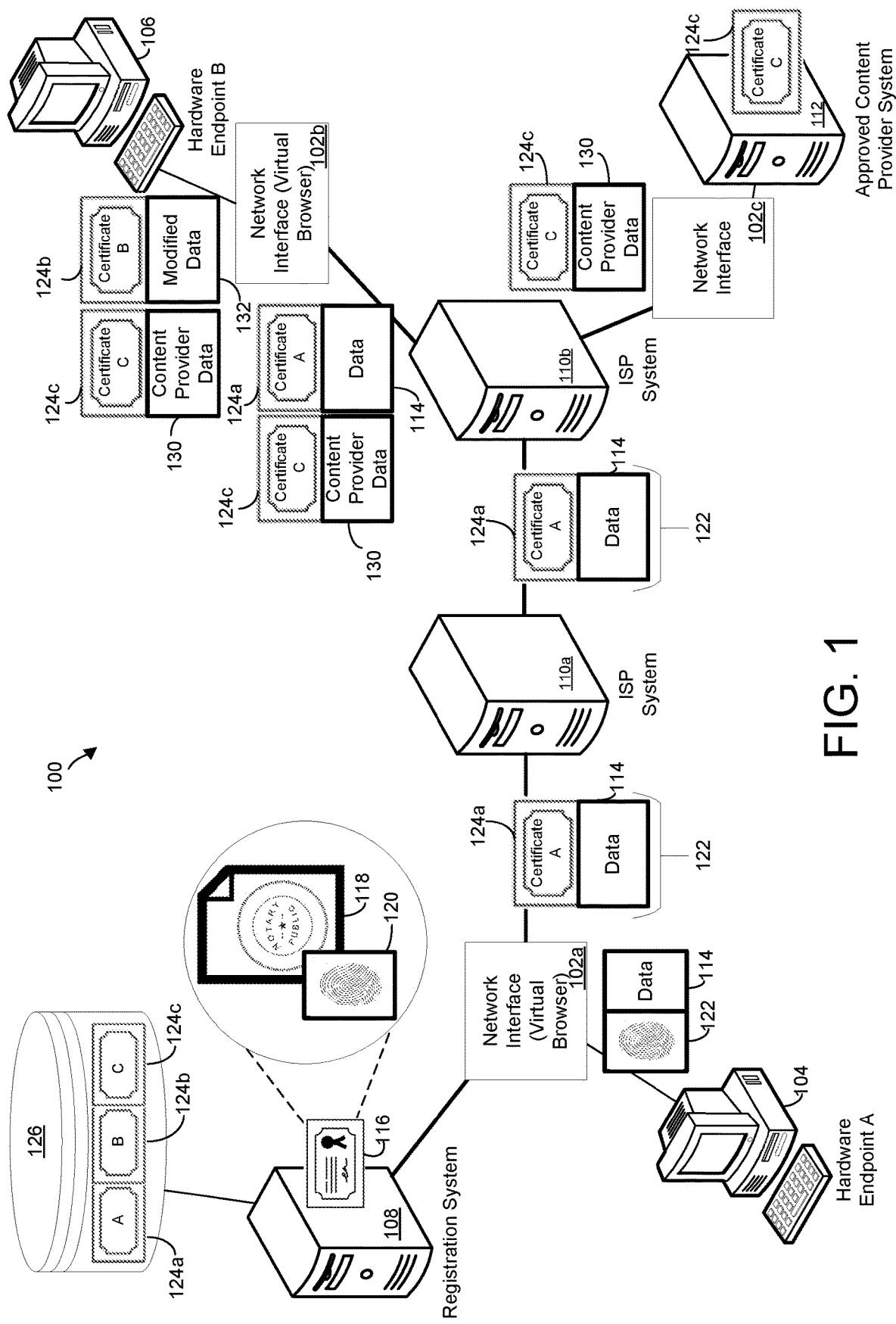
FIG. 1 shows a diagram of an attributed network.

FIG. 1 shows a diagram of an attributed network 100. The attributed network 100 includes one or more network interfaces 102a-c. One or more of the network interfaces 102a-c can include a virtual browser 102. The attributed network 100 includes one or more hardware endpoints, such as hardware endpoint 104 and hardware endpoint 106. The attributed network 100 includes a registration system 108 for registering users of the attributed network 100, as described in further detail below. The attributed network 100 can include content provider systems, such as approved content provider system 112. The hardware endpoints 104, 106, approved content provider system 112, and registration system 108 can be configured to communicate using Internet Service Provider (ISP) systems such as IPS system 110a and ISP system 110b, or similar network systems.

Data 114 that is transmitted over the attributed network 100 by systems of the attributed network 100 is associated with a digital registration certificate 116. The digital registration certificate 116 attributed data 114 on the attributed network 100 to a user (not shown) of the attributed network 100. Systems of the attributed network 100, such as hardware endpoints 104, 106 and approved content provider system 112, verify attribution of data, such as data 114, on the attributed network using the digital registration certificate 116, as described in further detail below. Systems of the attributed network 100 can thus attribute data that the systems receive to a specific user of the attributed network 100, rather than just to a device, such as hardware endpoints 104, 106. Since data can be attributed to users, rather than to devices, users cannot repudiate responsibility for data on the attributed network 100. Such non-repudiation enables privity between two or more users interacting with data on the attributed network 100. A user can hold another user with whom he or she has privity responsible for any data that is attributed to the respective other user on the attributed network 100. The privity between two or more users of the attributed network 100 enables the respective users to enforce agreements, conduct secure transactions, and punish misconduct on the attributed network 100 of other users with whom privity has been established. The attributed users are not able to repudiate their attributed data and evade responsibility for that data on the attributed network 100.

Users of the attributed network 100 register with the registration system 108 to be able to send data on the attributed network 100. The registration system 108 is online and accessible via the attributed network 100. The registration system 108 includes a registry 126. When a user registers with the registration system 108, an entry is generated in the registry 126 for that user.

Each user has one entry in the registry 126 that is associated with that user at any time. The entry for a user represents the user's "person" on the attributed network 100 and is unique to the user. Each entry in the registration system 108 includes the identity marker for that user, a privity marker 118 unique to that user, and a biometric identifier 120 that is unique to that user. Some or all of this data can be packaged into the digital registration certificate 116 for a user. In some implementations, the digital registration certificate 116 is generated for a user based on, but not including the identity marker for that user, a privity marker 118 unique to that user, and/or the biometric identifier 120 that is unique to that user. In some implementations, the digital registration certificate 116 for a user is stored in the user's entry in the registry, and retrieved for attributing data to the user. Each entry is immutable. For example, each entry can be immutable in time such that registration in the registry 126 for a user cannot be falsified later in time, duplicated, or otherwise fraudulently perpetrated. In some implementations, entries in the registration system 108 are part of a block chain. When a user successfully logs into the attributed network 100, the login is memorialized in time on the block chain for that user. When a user successfully logs into the attributed network 100, the registration system 108 sends the user his or her digital registration certificate 116, which accompanies data generated by the user or data that is otherwise the responsibility of the user on the attributed network 100. When data attributed to a user is verified, the user's entry in the registration system 108 is verified on the block chain. Thus, to successfully access the attributed network 100, the user registers with the registration system 108.

The user registers with the registration system 108 prior to accessing the attributed network 100. The user registers with the registration system 108 by obtaining the privity marker 118. The privity marker 118 is unique to the entry representing the user in the registry 126. The privity marker 118 includes a human-witnessed affirmation of the identity of the user. The privity marker 118 can include a physical token, such as an identification card, paper document, etc. for representing the human-witnessed affirmation of the identity of the user. For example, the privity marker 118 can include a notarized document attesting to the identity of the user. An actual notarized document is not required, however, and any human-witnessed attestation that establishes the identity of a user beyond repudiation is sufficient.

The privity marker 118 is accompanied by a biometric identifier 120 that is unique to the user. The biometric identifier 120 can include any collection of biometric data in any combination that the attributed network 100 can use to biometrically identify the user. Though the term "identifier" is used, the biometric identifier need not be a single item of data. The biometric identifier 120 can be unique to each user. The biometric identifier 120 can include any number of characteristics. For example, the biometric identifier 120 can include innate characteristics of the user. Innate characteristics of the user can include biological features that are inherent to the user, such as an iris scan, a fingerprint scan, a facial map, or other inherent biological features of the user. The biometric identifier 120 can include behavioral characteristics for recognizing the user. Behavioral characteristics such as driving habits, gait analysis, typing patterns on a keyboard, login patterns, login locations, semantic analysis of words used, and so forth. The biometric identifier 120 can be provided by the user either or both actively and passively via a client device of the user (e.g., hardware endpoints 104, 106).

The digital registration certificate 116 represents the signature of the user on the attributed network, and attributes data with which the digital registration certificate 116 is packaged to that user. The digital registration certificate 116 can include data representing the identity marker of the user, the biometric identifier 120 of the user, and/or the privity marker 118 for the user. The digital registration certificate 116 can include packed identity marker and privity marker 118 of the user. In some implementations, the digital registration certificate 116 includes other data that represents the user in the registry. To attribute data to a user, the digital registration certificate 116 is packaged with the data to be attributed before the data are sent over the attributed network.

The hardware endpoints 104, 106 can include any hardware system or device, or any other form of access point for accessing the attributed network 100. For example, hardware endpoints 104, 106 (also "endpoints") can include one or more of industrial Internet of Things (IOT) systems and devices, consumer IOT, autonomous vehicles, connected cars, autonomous aerospace systems and devices, laptop computers, tablets, smartphones, desktop computers, wearable devices, embedded systems, smart televisions, and so forth.

The hardware endpoints 104, 106 each include a biometric authentication system (not shown) for obtaining a biometric identifier 122 directly from the user at the time of access of the attributed network 100. The biometric identifier 122 can be any biometric data unique to the user used in any combination, similar to that of biometric identifier 120 of the registration system 108. The biometric authentication system includes any hardware or software for receiving and interpreting the biometric identifier 122 directly from the user either actively, passively, or in any combination of actively and passively. The biometric identifier 122 that received from the user of the hardware endpoint 104, 106 is compared with the biometric identifier 120 that is stored in the entry of the registry 126, along with the privity marker 118 of the registration system 108. If the comparison is successful, the user may access the attributed network 100 (and send attributed data). If the comparison is unsuccessful, the user cannot access the attributed network 100.

The biometric authentication of the user at the time of access of the attributed network 100 enables the user to generate data 114 that is attributed to the user himself or herself, rather than to the hardware endpoint 104, 106. The biometric authentication of the user is established by comparing the biometric identifier 122 received directly by the hardware endpoint 104, 106 at the time of access of the attributed network 100 to the biometric identifier 120 registered with the privity marker 118 in the registration system 108. Since the biometric identifier 120 has been verified though a process of being human-witnessed at the time of registration, as described above, such a comparison confirms that the user of the hardware endpoint 104, 106 is genuine. Attribution is thus tied to the user directly, rather than to the hardware endpoint 104, 106. As such, the attributed network 100 enables privity between users because the users are assured that data 114 on the attributed network 100 can be attributed to a particular individual who is responsible for that data on the attributed network 100 and whose identity has been confirmed through a human-witnessed process.

Once the biometric authentication of the user is established, the registration system 108 sends to the hardware endpoint 104, 106 the digital registration certificate 116 of the user. The digital registration certificate 116 is packaged along with data 114 sent (or generated, modified, etc.) by the user over the attributed network 100. The digital registration certificate 116 can be verified by another user of the attributed network 100 in order to verify privity between the user and the other user of the attributed network 100. The digital registration certificate 116 represents the digital signature of the user himself or herself, which has been human-witnessed and thus cannot be repudiated by the attributed user. For example, like a human-witnessed signature represents a person in a contractual agreement on paper, the digital registration certificate 116 represents the digital equivalent of such a measure.

The digital registration certificate 116 is packaged with data 114 sent (or generated, modified, etc.) by the user over the attributed network 100. Data on the attributed network 100 is packaged with a digital registration certificate 116 which can be verified by users of the digital registration certificate 116. The digital registration certificate 116 represents the user who is responsible for the data 114 on the attributed network 100. When data 114 is changed or otherwise is controlled by a second user of the attributed network 100, the digital registration certificate 116 of that data 114 is updated to attribute the data 114 to the second user, who is now responsible for the data 114. In some implementations, an entity or system of the attributed network 100 can keep a record of digital registration certificates 116 that have been attributed to particular data, such as for Developmental Operations practices (described in further detail with respect to FIG. 5, below). This enables systems and entities to keep the record of users who have updated or interacted with data over time, and each entry in the record represents a verifiable attribution to a particular user that cannot be repudiated by the user.

The digital registration certificate 116 does not prevent a user from sending data 114 over the attributed network 100, but rather attributes the data 114 to the user himself. For example, if a spammer sends a fraudulent offer over the attributed network 100 to another user, the spammer can be identified by the attribution represented in the digital registration certificate 116 of the spammer. Subsequent action can be taken against the spammer, such as legal action if the spammer broke laws governing fraudulent offers. An administrator of a system on the attributed network 100 can ban (or otherwise sanction) the spammer from the attributed network 100 or a portion of the attributed network 100 to prevent future bad acts. For example, an email accounts provider can ban the user from creating or using email accounts for that provider. For example, a banking institution can prevent the user from opening or using online bank accounts with that institution. Since the attribution is to the user, rather than to an account of the user or a device of the user, the user can be unilaterally sanctioned for bad behavior on the attributed network 100, preventing him or her from sidestepping punishment by opening additional accounts or using new devices. In another example, a social network can prevent users from opening multiple accounts under different names. In another example, online forums, such as news aggregators, link aggregators, newspaper websites, or other such forums, can prevent "building and selling" of accounts that appear genuine but that can be used as a block to influence forum users. Additional examples of application of the digital registration certificate 116 attribution to data 114 of the attributed network 100 can include enforcing an online contract, purchase, or even statement, pledge, or promise in accordance with contract laws or other laws.

Figure 2:
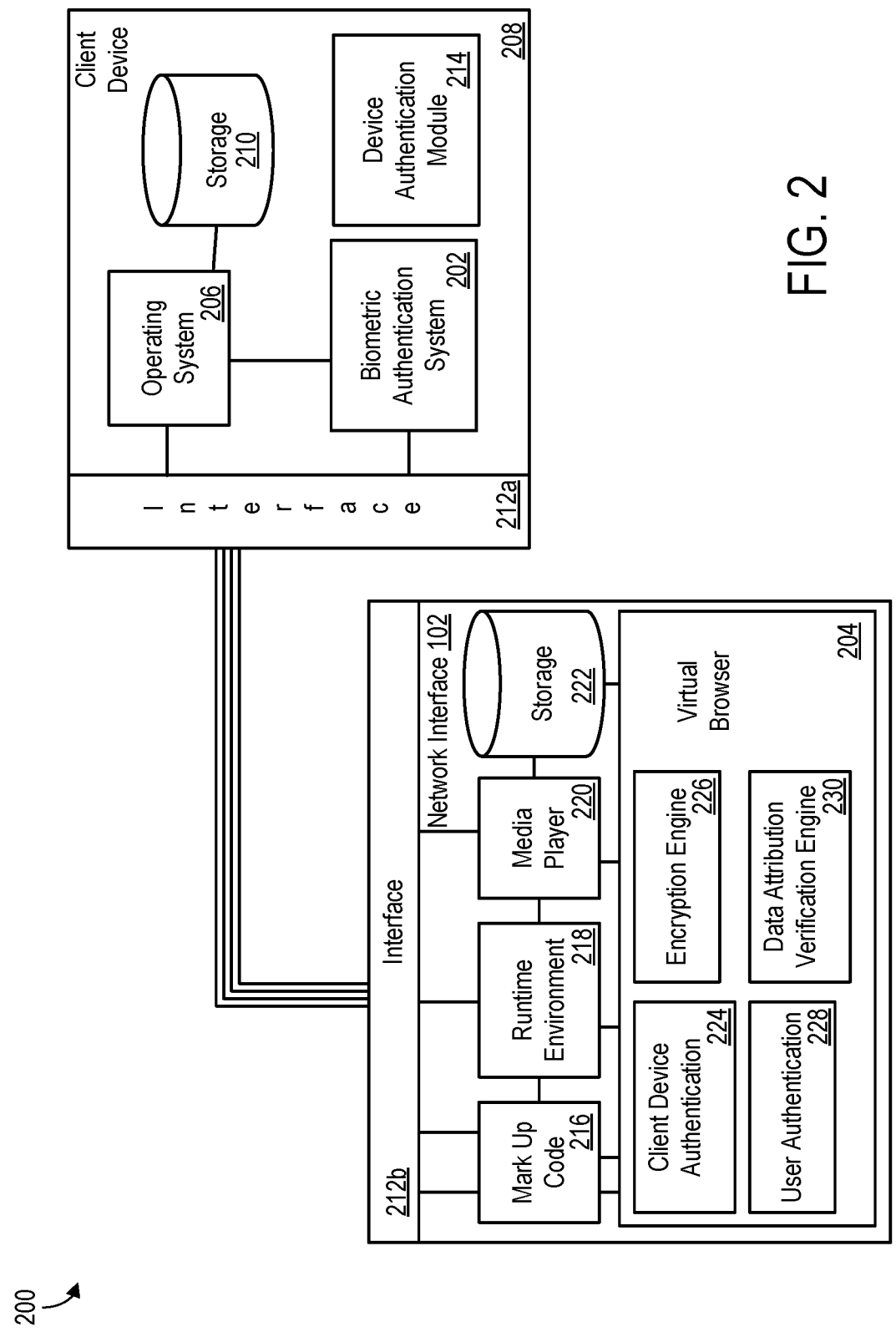
FIG. 2 shows a block diagram of a hardware endpoint.

Turning to FIG. 2, a hardware endpoint system 200 is shown, such as for hardware endpoints 104, 106. The hardware endpoint system 200 can include computing systems, such as smartphones, wearable devices, desktop computers, laptops, tablets, and so forth, which are capable of accessing the internet. As stated above, the hardware endpoint system 200 include a biometric authentication system 202. In some implementations, the biometric authentication system 202 can include a dual input reader, the inputs consisting of stored physiological data of a user on a chip disposed on a smart card, and a fingerprint scan for comparison against the stored data. The biometric authentication system 202 can be self-contained so that the comparison of the biometric data with the data stored on the chip is done immediately on board the reader without relying upon communications to or from an external source in order to authenticate the user. The biometric authentication system 202 can prevent communication with external sources prior to user authentication being confirmed, so as to prevent user data from being stolen or corrupted. The biometric input to the biometric authentication system 202 can include a retina scan, voice identification, saliva or other inherent or behavioral biometric data as described above. The biometric authentication system 202 can include any portion or all of the features of the biometric authentication device described in U.S. Pat. No. 6,219,439, incorporated in entirety herein by reference.

The hardware endpoint system 200 is secured using the biometric authentication system 202. Securing the hardware endpoint system 200 prevents users of the attributed network 100 from misrepresenting themselves as other users of the attributed network 100. In some implementations, the hardware endpoint system 200 is secured by a biometric authentication system 202 that runs independently from an operating system 206 running on the hardware endpoint system 200. In some implementations, the biometric authentication system 202 can include a removable hardware system that is keyed to the user and without which the hardware endpoint system 200 cannot operate. In some implementations, the removable hardware system can include a SIM (Subscriber Identification Module) or E-SIM (Embedded Subscriber Identification Module).

In order to access the attributed network 100, the user logs into the attributed network 100 using a virtual browsing system 204, as described in further detail below. As long as the biometric identifier 122 of the user remains valid, the user may continue to access the attributed network 100. For example, the user may be required to periodically resubmit a biometric identifier to the hardware endpoint system 200, such as a fingerprint scan, iris scan, etc. In some implementations, after an initial submission of a high quality biometric identifier, the hardware endpoint system of the attributed network 100 may require merely a lower quality submission of a biometric identifier periodically to maintain access to the attributed network 100 while the user remains logged into the attributed network 100. For example, the hardware endpoint system may initially require identifiers including an iris scan, a fingerprint scan, and a voice sample, but subsequently only require one of those identifiers periodically (e.g., once every hour) to maintain access. In some implementations, the user's biometric can be continually monitored in order for the user to maintain access to the attributed network 100. For example, a user's browsing habits, typing/keystroke or mouse click patterns, and so forth can be monitored while the user is logged into the attributed network 100. As long as the user maintains biometric fidelity above a threshold (either via passive monitoring of biometric behaviors via or active measurement of inherent biometric features, either individually or any combination), the user can access the attributed network 100.

Returning to FIG. 1, the hardware endpoints 104, 106 of the attributed network 100, as well as other approved content provider systems 112, access the attributed network 100 through network interfaces 102a, 102b, and 102c, respectively. The network interfaces 102 represent the gateways to the attributed network 100 from hardware devices. In order to access the attributed network 100, a user logs into the attributed network 100 via the network interfaces 102. The network interfaces are configured to access the registration system 108 and obtain the digital registration certificate 116 of a user that is attempting to log into the attributed network 100. In some implementations, a network interface 102 includes a hardware device which may itself be verified as trustworthy by an administrator of the attributed network 100, as described in greater detail with respect to FIG. 6. In some implementations, the network interface 102 includes a software module (e.g., an application programming interface, software plugin, or other module) that is a part of software operating on the hardware endpoint 104, 106, or approved content provider system 112. In some implementations, the network interface 102 includes a software module operating on a device of the attributed network 100, such as on the ISP system 110a, 110b. In some implementations, the network interface includes a virtual browser (e.g., virtual browser 204 of FIG. 2), which acts as a portal for accessing the attributed network 100. The network interface 102 can include any combination of interactive interfaces for one or more hardware systems of the attributed network 100 and passive subroutines operating on the one or more hardware systems of the attributed network 100.

The network interfaces 102 package data 114 with the digital registration certificate 116 of the user to generate attributed data on the attributed network 100. Data 114 that is not packaged by a network interface with the digital registration certificate 116 is not accessible on the attributed network 100.

An example use case of the attributed network 100 is now described. A user registers with the registration system 108 of the attributed network 100, providing a biometric identifier 120 that has been human-witnessed, as evidenced by the privity marker 118. The registration system 108 enters the user's identifier (e.g., an email address, account name, legal name, etc.) into an entry of the registry 126 along with the privity marker 118 and the biometric identifier 120. The user is now a registered user, and the entry in the registry 126 represents that user and is immutable. The registered user accesses a hardware endpoint 104 and logs into the hardware endpoint using a biometric identifier 122, as described above. Once the hardware endpoint verifies the biometric identifier 122. The biometric identifier 122 is sent via the network interface 102a to the registration system 108. The registration system 108 compares the biometric identifier 122 to the biometric identifier 120 of the user's entry. If the biometric identifiers match above a threshold, the registration system 108 sends to the hardware endpoint the digital registration certificate 124a for the user. As described below, the threshold of agreement between biometric identifiers 120, 122 can vary depending on the user (e.g., high clearance users may require greater fidelity biometric identifiers 120, 122 and agreement between those biometric identifiers)

Once the hardware endpoint 104 receives the digital registration certificate 124a, the hardware endpoint may access the attributed network 100. The user can generate, modify, etc. data 114 such that that user is responsible for the data 114. The network interface 102a packages the data 114 with the digital registration certificate 124a. The packaged data is encrypted to prevent spoofing of the digital registration certificate 116 by another user that may attempt to intercept the data 114. The packaged data 122 is thus tagged with the user's digital registration certificate 124a (in this case, certificate A). The packaged data 122 is sent online and handled through any number of various networked systems, such as ISP systems 110a, 110b. The packaged data 122 reaches the network interface 102b of hardware endpoint 106 and is decrypted for access by the hardware endpoint 106. If a second user modifies the data 114 to generate modified data 132, such as using the hardware endpoint 106, the second user's digital registration certificate 124b is applied to the modified data 132, and the data 114 is now attributed to the modified data 132 by his digital registration certificate 124b. The user of hardware endpoint 104 is no longer responsible for the modified data 132.

In this example, the approved content provider system 112 (e.g., a website publisher system), which has registered with the registration system 108, generates and sends data via an embedded network interface 102c. The content provider data 130 is packaged with the digital registration certificate 124c of the particular user of the approved content provider system 112 that generated or is otherwise responsible for the content provider data 130. For example, if an editor uploads a newspaper article, that editor's digital registration certificate 124c is packaged with the article. If the article is later updated by another user, that user's digital registration certificate is packaged with the updated content provider data 130. The content provider data 130 is send through one or more network systems, such as ISP system 110b, to hardware endpoint 106. The user of the hardware endpoint 106 receives the content provider data 130, which is attributable to the author of that content provider data 130, rather than to the approved content provider system 112.

In some implementations, entities register with the attributed network 100 in a manner similar to that of individuals as described above. An entity includes a legal entity, such as a corporation, partnership, non-profit, etc. The entity can include any organization that is capable of entering into contractual agreements, conducting transactions, etc. on behalf of its members, stakeholders, shareholders, etc. The entity takes responsibility for its data, just as the entity takes responsibility for offline actions of its members, stakeholders (e.g., employees), etc. As such, non-repudiation of the data on the attributed network 100 that is attributed to the entity would apply at the entity level, rather than at an individual level.

For example, a user registers with the attributed network 100 personally as user@emailprovider.com and provides a biometric identifier 120 and a privity marker 118 in accordance with the processes and systems described above. The user may also register as user@corporation.com. The user again provides biometric identifier 120 and a privity marker 118, but now one that includes a corporate identifier (e.g., an email address, employee number, etc.) for a company. The corporate identifier includes a signature block for a corporate officer who witnesses that the user is using his or her "corporate" email for use on the attributed network 100. The company, by adding the signature to the privity marker 118 that is witnessed, states that when the user access the attributed network 100 using his or her corporate identifier, the user is acting on the behalf of the company, and privity accrues to the user and also the company based on the employment status of the user. In such cases, responsibility for data 114 on the attributed network 100 can belong to the user or to the company based on how the user accesses the attributed network 100.

In some implementations, a company may deny access to a registrant attempting to register as an agent of the company as described above. An interface can be provided for the attributed network 100 for a company to audit the registration system 108 for entries associated with the company (e.g., the company's domain name, email list, etc.). For example, Corporation A can "audit" all entries under a @corporationa.com entry and remove them at will. In these above examples, users are humans registering on behalf of an entity, rather than being non-human users.

Turning back to FIG. 2, the example hardware endpoint system 200 includes both a client device 208 and a network interface 202, such as a browser. The client device 208 includes any hardware that can access online networks and interact with data on those networks. The client device 208 thus, in some implementations, includes an operating system 206 and storage 210, as well as an interface 212a for interacting with other hardware or software (e.g., via interface 212b). In some implementations, the client device 208 includes a device authentication module 214 which is used for accessing the client device itself. The device authentication module 214 includes a passkey interface, fingerprint scanner, etc. The client device 208 includes the biometric authentication system 202, described above. In some implementations, the biometric authentication system 202 is a stand-alone hardware device that is configured to interface with the client device 208. In some implementations, the biometric authentication system 202 is built into the client device 208. The biometric authentication system 202 ensures that the current user of the hardware endpoint system 200 is genuine. This is distinct from simply logging to the device, such as with a passkey, using the device authentication module 214, which may be a conventional system. The biometric authentication system can initially verify and continually monitor biometrics of a user to confirm that the user is genuine and not misrepresenting another user, as described above. In some implementations, the client device includes the hardware endpoint 104. In some implementations, the hardware endpoint 104 includes the entire hardware endpoint system 200, including the network interface 202.

The hardware endpoint system 200 also includes the network interface 202. In some implementations, the network interface 202 includes a browsing application. In some implementations, the network interface 202 is embedded into the hardware endpoint system 200. The network interface includes modules for accessing online environments, such as a markup code module 216, a JavaScript runtime module 218 (or other runtime module), a media player 220 and storage (e.g., a cache) for stored media 222.

The network interface 202 includes a virtual browser 204, as described above. The virtual browser 204 is used to retrieve the digital registration certificate 116 of the user from the registration system 108, package data 114 to be sent on the attributed network 100, verify user authentication, and verify data attribution of data received via the attributed network 100.

The virtual browser includes a client device authentication engine 224 which verifies that the client device 208 is in an authorized operational state, as described in relation to FIG. 3, below. The virtual browser includes a user authentication engine 228 which verifies, in coordination with the registration system 108, that the biometric identifier 122 of the user matches the biometric identifier 120 stored in the registration system 108. The virtual browser includes an encryption engine 226 that encrypts data being transmitted via the attributed network 100. The encryption engine receives the data and the digital registration certificate 116 of the user, packages these elements together, and encrypts the package so that intermediate users cannot forge the digital registration certificate 116 or the data 114.

The virtual browser verifies, by the data attribution verification engine 230, data received from the attributed network 100 as being attributed to a registered user of the network. As data are received by the hardware endpoint system 200, the user of the hardware endpoint system 200 is taking responsibility for that data if modified and retransmitted on the attributed network 100. The virtual browser 204 of the network interface 202 thus verifies the data before permitting the data to be accessed by client device 208. The user of the hardware endpoint system 200 is thus assured that data received via the attributed network 100 can be attributed to a user of the network.

Figure 3:
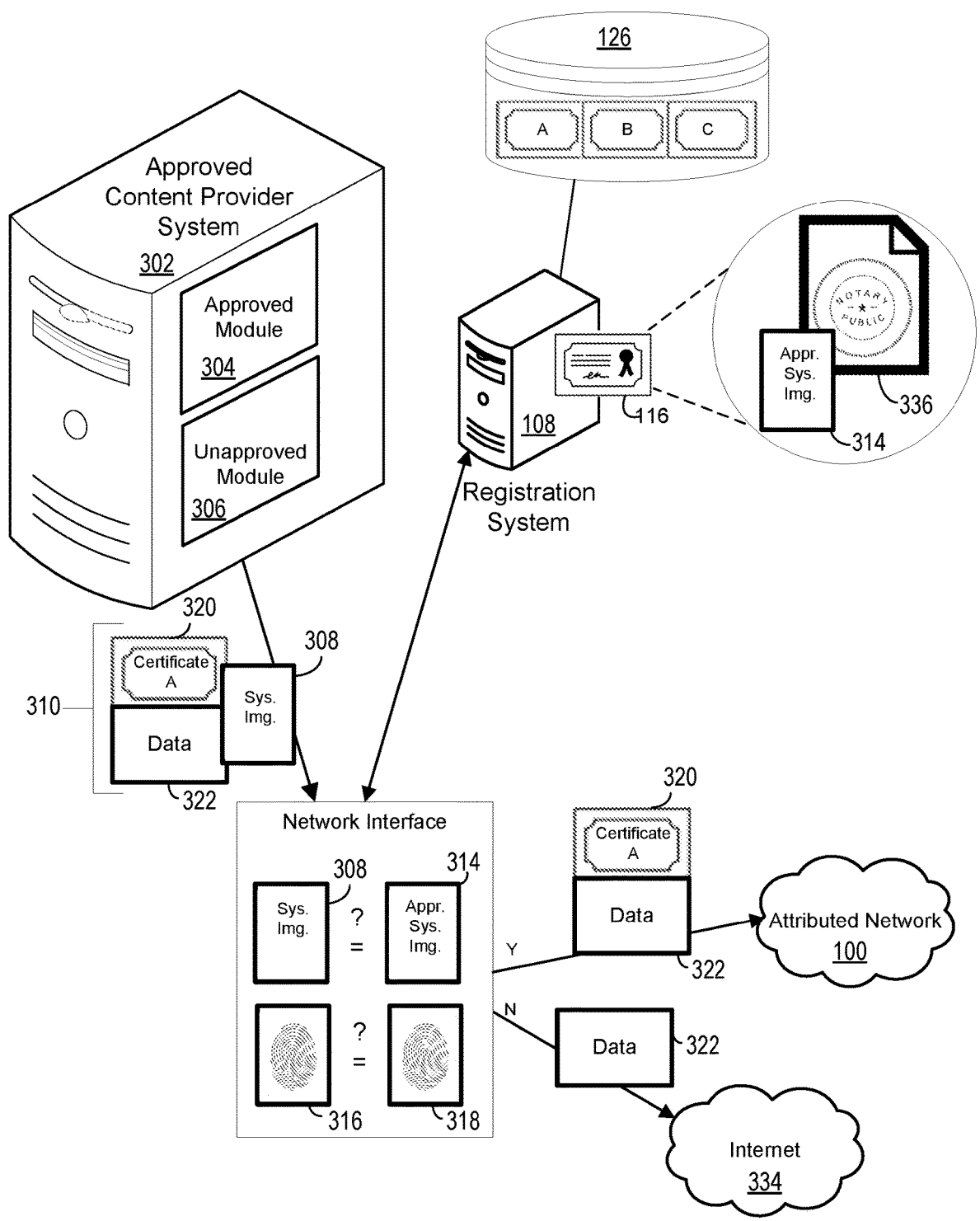
FIG. 3 shows a diagram of an attributed network.

FIG. 3 shows an environment 300 for verifying the operational states of endpoint devices (such as hardware endpoints 104, 106 and approved content provider system 112). Verifying endpoint devices ensures that the attributed network 100 environment is secure and that devices of the attributed network 100 are operating appropriately. This can be important for various endpoint devices, which may be using attributed network 100 to receive and send data once a user logs into the endpoint device. For example, a web server may be hacked and reporting false information. Such a device is not permitted to send and receive data via the attributed network 100. In another example, an autonomous vehicle may in an unsuitable operational state, such as having headlights that do not work or tires that have worn out and need replacing. In another example, the user of the device may not be in a suitable state (such as a user that is too intoxicated to drive a vehicle). In such cases, the operational state of the hardware endpoint is found to be unsatisfactory, and the hardware endpoint does not access the attributed network 100.

FIG. 3 shows an approved content provider system 302 that is registered with the registration system 108 is on the attributed network 100. The approved content provider system 302 includes a software module that is an approved module 304. In some implementations, the module can be approved by the user, manufacturer, etc. and be tagged with the digital registration certificate 320 of the module's author. The approved content provider system 302 has also been modified to include an unapproved module 306. The unapproved module can be any modification to the hardware or software that changes the system image reported to the client device authentication engine 224 of the hardware endpoint. Since the approved content provider system 302 includes an unapproved module 306, the approved content provider system 302 is not in a satisfactory operational state. The approved operational state of an endpoint is associated with the digital registration certificate 116 of the user who last approved the operational state and who is responsible for the operational state of the endpoint.

In some implementations, the attributed network 100 maintains a "gold copy" of software for an endpoint (such as hardware endpoints 104, 106), and/or the settings for that endpoint, which together can represent the operational state of the endpoint. The gold copy includes content that is attributed to the registered user (a system, network, DevOps, or security administrator). The gold copy is associated with the registered user. The content of the gold copy is entered on a block chain to establish its integrity at specific point in time. In some implementations, the content of the gold copy is encrypted (e.g., by the network interface 102) upon being sent to the block chain and decrypted upon extraction from the block chain to mitigate illicit substitution.

For example, the attributed network 100, using real time event processing of streaming data (e.g., IBM Streams or Tibco StreamBase), can periodically review the operational state of systems (e.g., hardware and software systems) within the attributed network. If a system is configured to reveal its operational state, the attributed network re-instantiates the proper operational state when an improper operational state is detected.

For example, for an endpoint connected to the attributed network (smart phone, industrial IOT device, etc.), the attributed network 100 maintains validity data for each type of endpoint (e.g., a brand A smartphone, or a brand B turbine engine). The validity data are defined by the entity responsible for the endpoint (e.g., a manufacturer, systems integrator, etc.). The attributed network 100 validates the operational state of the endpoint 104, 106 against an approved state, either upon connection, periodically, or both.

In some implementations, when the operational state is updated, the digital registration certificate 116 associated with the operational state of the endpoint is tagged with the digital registration certificate 116 of the author that is doing the modification and who is now responsible for the operational state of the endpoint. In some implementations, the operational state of the endpoint is a software system image 308 of the endpoint, which may include reports of various sensors, etc. of the endpoint (including data from the biometric authentication system 202).

The packaged data 310 and the system image 308 are sent by the approved content provider system 302 to the network interface 312. The system image 308 is compared to a stored system image 318 that has been approved and that is associated with a digital registration certificate 320 of a registered user. In some implementations, a biometric identifier 316 of the approved content provider system 302 is compared to a biometric identifier 318 of the registration system 108. In cases where the operational state matches the approved operational state, which can be confirmed by comparing system image 308 obtained from the approved content provider system 302 to an approved system image 314 associated with the digital registration certificate 320, data package 310 from the approved content provider system 302 is transmitted using the attributed network 100. In cases where such verification of the endpoint is unsuccessful, the approved content provider system 302 can be prevented from sending any data (or receiving data), operating, etc. In some implementations, where such verification of the endpoint is unsuccessful, the approved content provider system 302 sends data 322 that are not attributed over conventional networks, such as the internet 334.

In some implementations, the approved system image 314 can be human-witnessed, and associated with a privity marker 336 in a manner similar to users. The attributed network 100 enables systems to be attributed in the registry. For example, while an operational state of a system can be attributed to an author who assumes responsibility for that operation state of the system, the operational state itself can be independently attributed to an approved state that has been authorized in a human-witnessed manner. For example, a company can use the attributed network 100 to assign privity to an autonomous vehicle AI (Artificial Intelligence) algorithm which is stored in the registry 110 of the attributed network 100. When a user attempts to use the autonomous vehicle, the operational state of the autonomous vehicle is compared against the approved state, as described above, and the user is permitted to use the autonomous vehicle if the operational state of the autonomous vehicle matches (e.g., above a threshold) the approved operational state.

Figure 4:
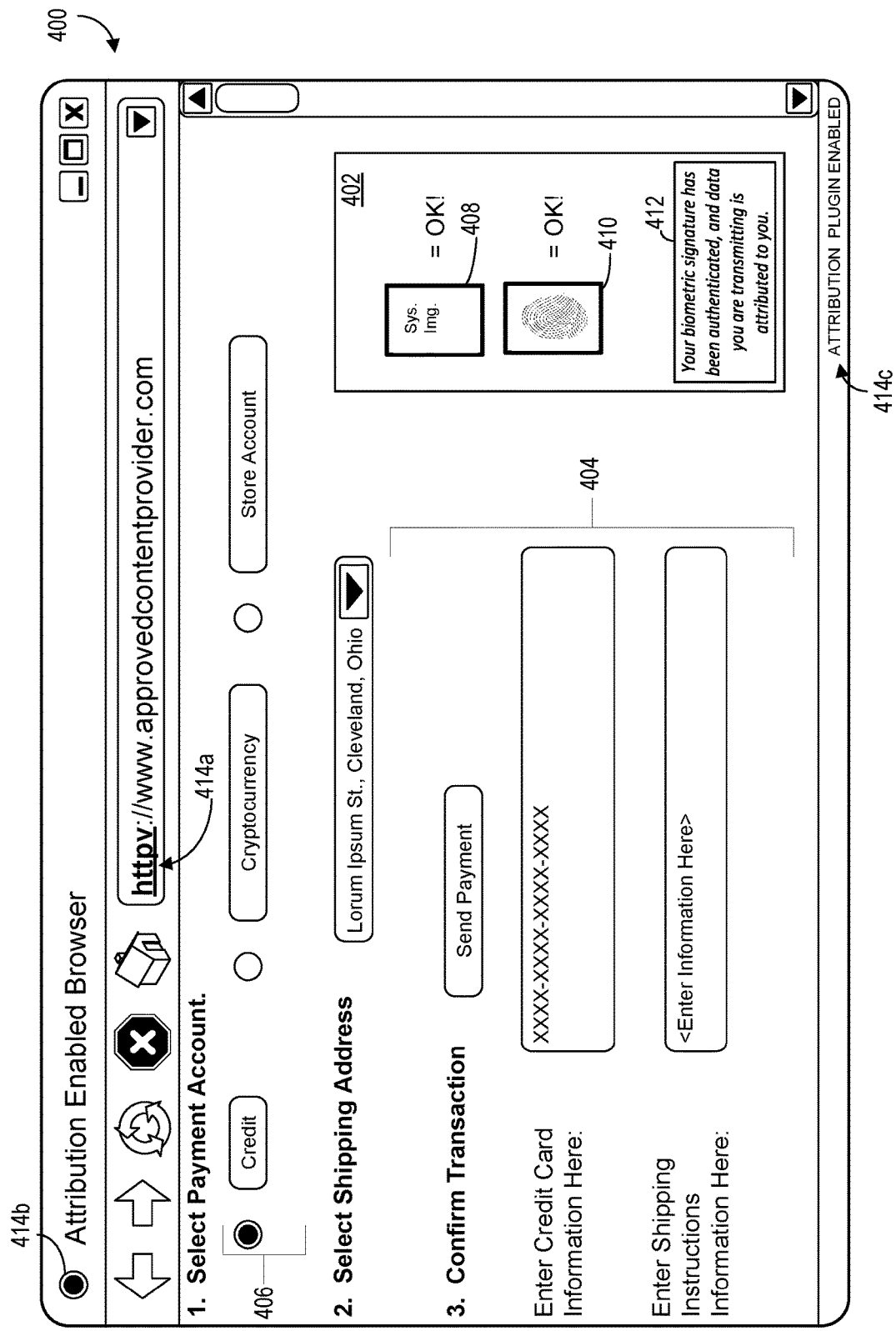
FIG. 4 shows an example user interface for a virtual browser.

FIG. 4 shows an example user interface 400 for a virtual browser, such as virtual browser 204. The interface 400 includes an attribution status window 402 and a browsing window 404. A user can input attributed data using one or more controls 406 of the browsing window 404. The data input is attributed to the user using the systems and processes described above.

The attribution status window 402 includes one or more of indicators 408, 410, 412, that inform the user that he or she is sending and receiving attributed data. Additional indicators 414*a-c* can be shown outside a main window of the browser. For example, a site using the attributed network 100 may include an HTTPV:// or similar header 414*a*. A toggle button 414*b* can be included on a browsing window of interface 400. Text 414*c* can be shown in a footer (or other location) of the interface 400. Other such indicators can be used.

The attribution status window 402 can be a small notice on the screen, hidden from view, or otherwise be any size or shape. In some implementations, the attribution status window 402 can include controls to allow the user to toggle use of the attributed network 100, such as for performing various activities online. The virtual browser can be a plug-in to a conventional browser. As such, the browsing window 404 can represent a conventional browsing experience, or can include indicators showing what data are attributed that are being viewed by the user. The virtual browser can include controls for displaying to whom selected data are attributed, controls for expressly verifying data, altering required thresholds of verification for data being received, blocking data attributed to particular users etc. For example, a user may require a high level of certainty for the verification of a user's biometric identifier in order to permit his endpoint to receive data over the attributed network 100. In some implementations, the user may block data of particular users and maintain a list of blocked users. A user can manipulate threshold verification levels to be different for different users. For example, a user might require a high threshold of verification for banking applications and lower thresholds for online games.

In some implementations, the interface 400 includes controls to verify the integrity of the interface 400 itself. For example, the endpoint 104, 106 presents the interface 400 with a daily passphrase which when entered into the interface (e.g., just after login), produces a privity marker or other identifier of the interface integrity. Such controls mitigate the ability to misrepresent the proper interface 400 with an inauthentic one (e.g., when the endpoint 104, 106 security is compromised or improperly accessed by a malicious user).

Figure 5:
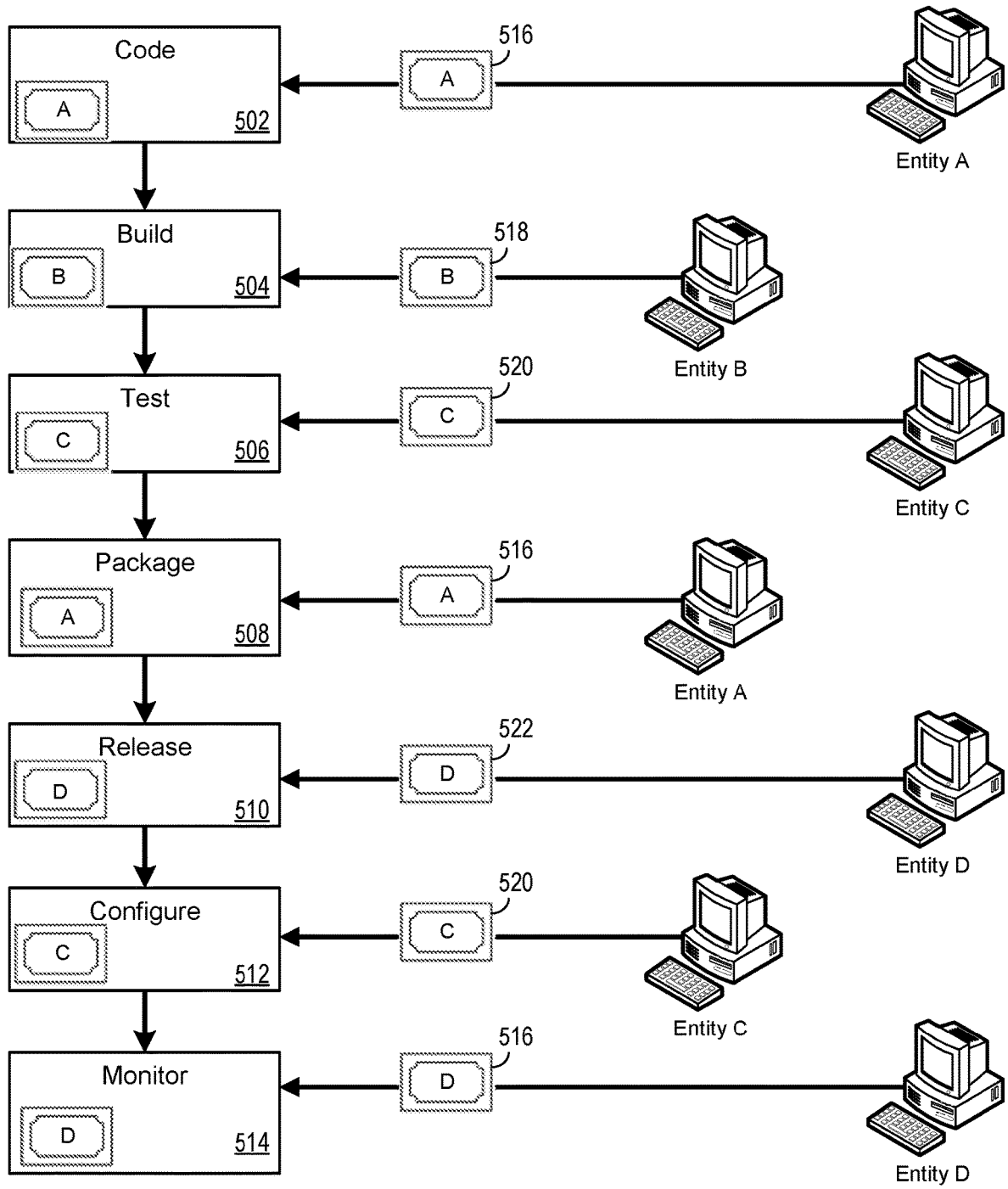
FIG. 5 shows a flow diagram for developmental operations in an attributed network.

FIG. 5 shows a flow diagram 500 for developmental operations in an attributed network. Each stage of the developmental operations can be tagged with a digital registration certificate 116 for the user responsible for the software at that stage when the software is passed to the next stage. A developmental operations (DevOps) system administrator can keep a record of digital registration certificates at each stage of development so that responsible users can be identified (e.g., to debug a problem, make updates, etc.).

The first stage 502 of the DevOps flow includes coding. Entity A is responsible for coding, and entity A's digital registration certificate 516 is associated with the software project at stage 502. When entity B modifies the code at the build stage 504, the digital registration certificate 518 of entity B is now associated with the software project. Similarly, when entity C tests the software project at stage 506, entity C's digital registration certificate 520 is associated with the software package. This continues for the remaining stages of development, at the package stage 508, the release stage 510, the configuring stage 512, and the monitoring stage 514. The DevOps administrator can keep a record of each entity's involvement and the stages at which each was involved. Each entry in the record is associated with a digital registration certificate 116 that has been human-witnessed and thus establishes privity with the entity at that stage, which prevents repudiation of responsibility by the entity associated with a stage. The DevOps implementation shows how the attributed network 100 adds privity, attribution, accountability and the ability to apply consequences to a digital supply chain, in this case the software build of a system.

Figure 6:
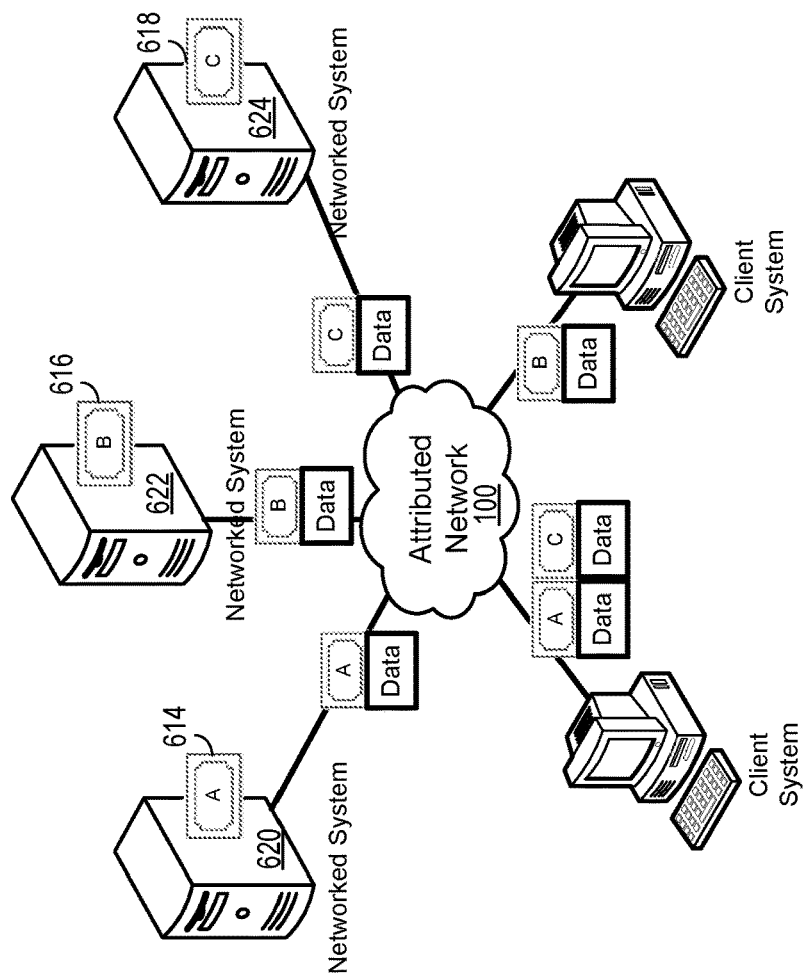
FIG. 6 shows an attributed environment with administrative users.
Figure 6:
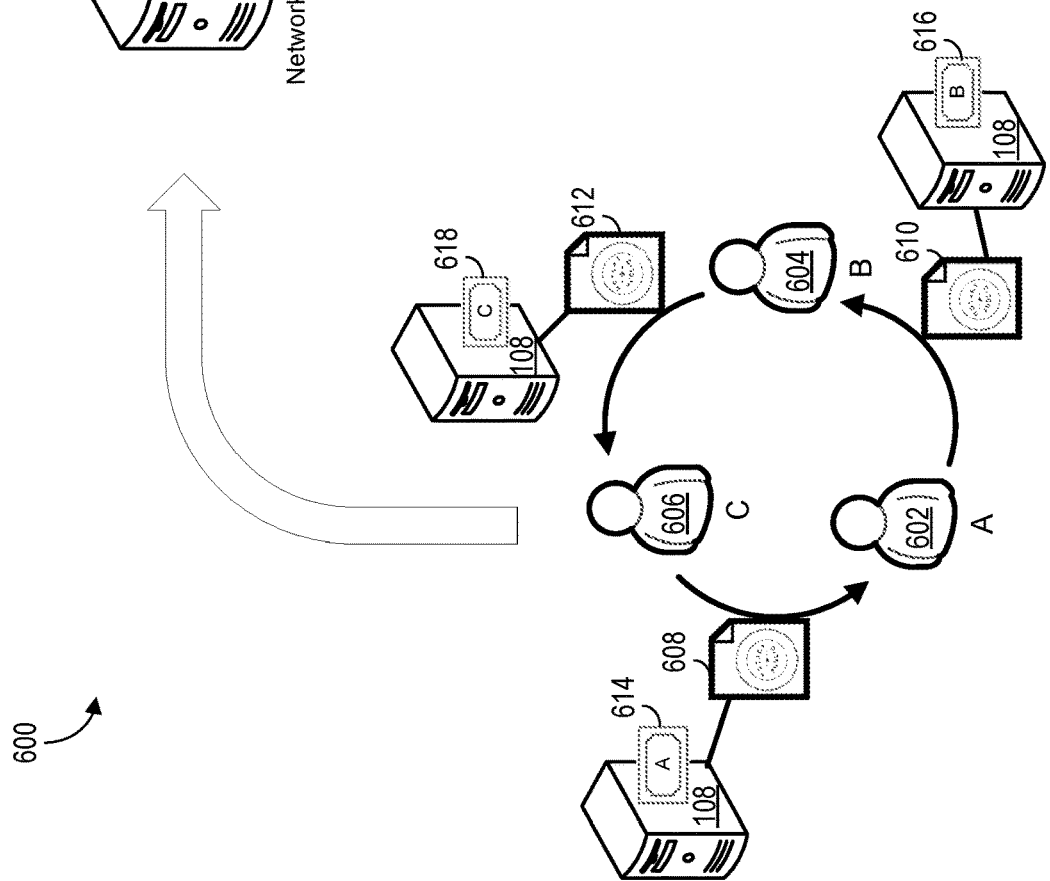

FIG. 6 shows an environment 600 for attributed network 100 including administrative users and networked entities of the attributed network 100 that are held to a high level of verification to ensure fidelity of the attributed network 100.

Administrative users 602, 604, and 606, labeled A, B, and C, respectively, manage and maintain a system of the attributed network 100. These users can be required to register with the registration system 108 of the attributed network 100 at a frequency that is greater than that of ordinary users and at a higher biometric threshold. Similarly, administrative users 602, 604, 606 of a system of the attributed network 100 may be required to human-witness each other, such that the privity markers 608, 610, 612 of the users 602, 604, 606, respectively, have increased security. When administrators 602, 604, 606 of a system of the attributed network 100 modify the network, his digital registration certificate 614, 616, 618, respectively, which may include special privileges for modifying the system of the attributed network 100. Likewise, various networked systems 620, 622, 624 of the attributed network 100 may require a digital registration certificate 614, 616, 618 of a particular administrator in order to permit modification of the respective networked system 620, 622, 624. Such actions establish trust, backed by human-witnessed markers, for networked systems 620, 622, 624 of the attributed network 100.

Networked systems 620, 622, 624 can include software or hardware (or any combination) for a system on the attributed network 100. For example, the networked systems 620, 622,

624 can each include an application programming interface (API) for configuring other systems of the attributed network 100. Each of the networked systems can be configured only by particular administrative users 602, 604, 606 that have undergone a specialized registration process for the attributed network 100.

The attestation of systems and devices in the attributed network 100 establishes the root of trust for the attributed network 100, also termed "attribution in depth." The attributed network 100 provides knowledge of the identity of the user accessing the attributed network 100. The attributed network 100 provides knowledge of the approved state of the systems (e.g., networked systems 620, 622, 624) and the users who constructed software of the system. The attributed network 100 provides knowledge of the administrators 602, 604, 606 of the system, the administrators 602, 604, 606 who manage the programming interface, the administrators 602, 604, 606 who approve software packages, etc. Users of the attributed network 100 can verify these states periodically or on demand, such as upon initial verification via an endpoint 104, 106. Users of the attributed network 100 can deny access to their endpoint 104, 106 or reinstate a known good configuration from a preapproved operational state (e.g., a "gold copy" of software) that is associated with a registered user and placed on a block chain. For example, code and configuration of the virtual browser 202 is a gold copy. Since the code and configuration of the virtual browser 202 are executed on the attributed network 100 and accessed by a user virtually via an endpoint 104, 106 (rather than installed on the endpoint), virtual browser is in a known, controlled and verifiable state and can be trusted.

The systems and methods described above establish a system root of trust to coincide and a human root of trust. These systems and methods enable forensic analysis of any anomaly or wrong doing on the attributed network 100 and establish a continuous audit trail that is verifiable and reviewable (e.g., in a security operations or incident response center).

Figure 7:
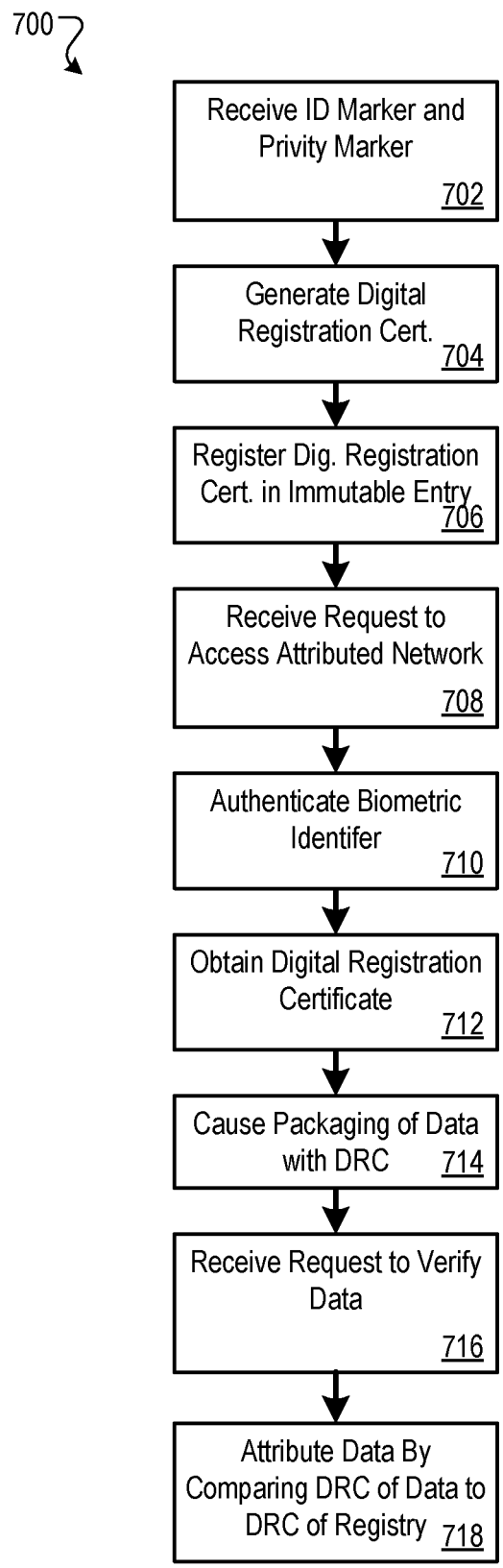
FIG. 7 shows a block diagram representing steps for using an attributed network.

FIG. 7 shows a flow diagram of a process of the attributed network 100. A system of the attributed network 100 receives (702) an identity marker unique to a user and a privity marker indicative of a human-witnessed verification of the identity of that user. The attributed network 100 generates (704) a digital registration certificate for the user, such as by packaging the identity marker and the privity marker. The attributed network 100 registers (706) the digital registration certificate of the user in an entry of a registry of the attributed network, the entry being immutable in time. The attributed network 100 receives (708) a request to access the attributed network. The attributed network 100 authenticates (710) a biometric identifier received from the user requesting access. The attributed network 100 obtains (712) the digital registration certificate of the user requesting access. If login is successful (e.g., the biometric identifier matches a stored biometric identifier, in the registry entry of the user, above a threshold), the attributed network causes packaging (714) of any data for which the user is responsible with that user's digital registration certificate. When the attributed network 100 receives (716) a request to verify the data, the attributed network 100 attributes (718) the data by identifying the user associated with the digital registration certificate that is packaged with the data.

Figure 8:
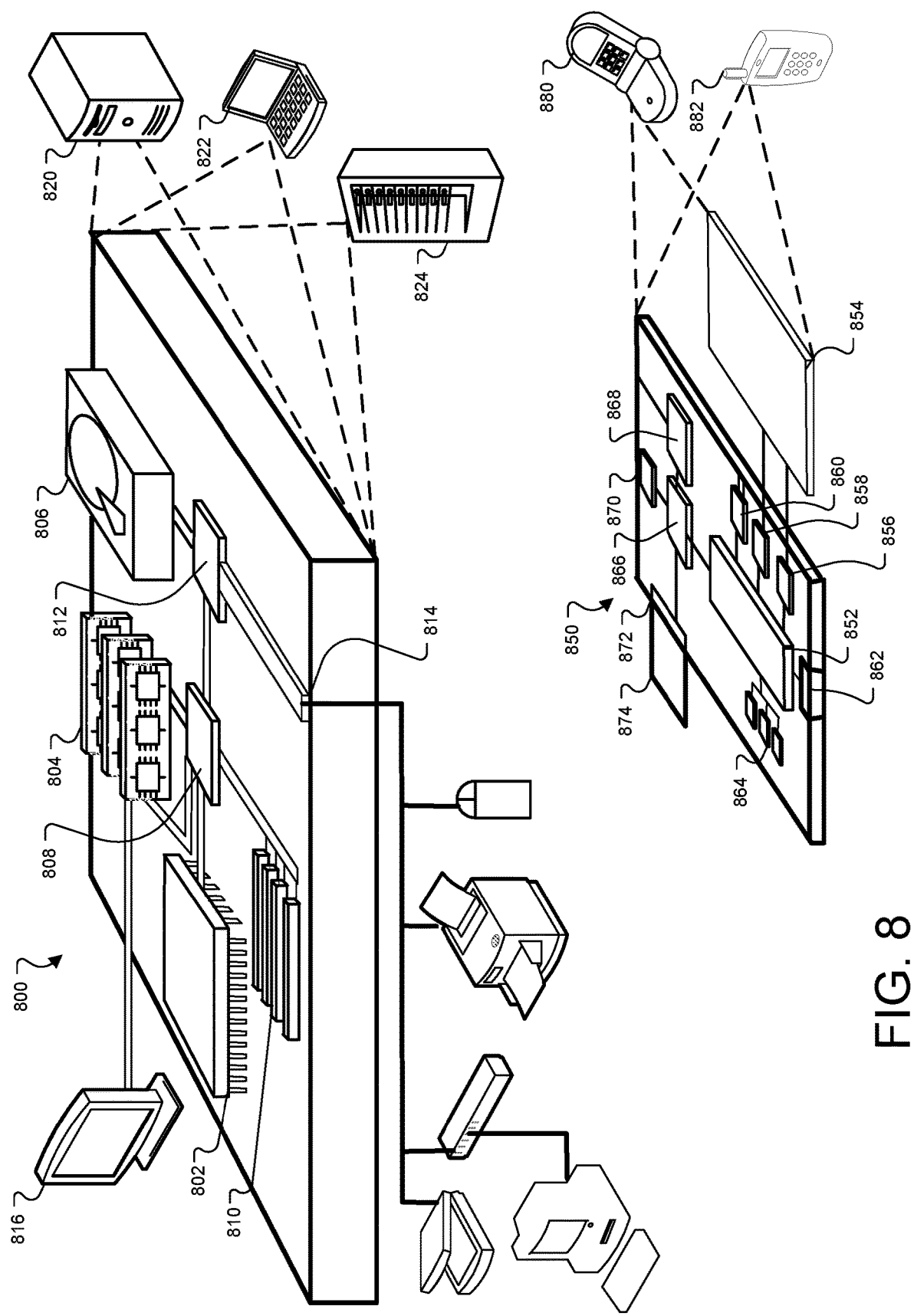
FIG. 8 shows a block diagram of a computing device.

FIG. 8 is a block diagram of computing devices 800, 850 that may be used to implement the hardware endpoints (e.g., endpoints 104, 106, or approved content provider system 112) described above, as either a client or as a server or plurality of servers. Computing device 800 is intended to represent various forms of digital computers, such as laptops, desktops, workstations, personal digital assistants, servers, blade servers, mainframes, and other appropriate computers. Computing device 850 is intended to represent various forms of mobile devices, such as personal digital assistants, cellular telephones, smartphones, and other similar computing devices. Additionally, computing device 800 or 850 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations of the inventions described and/or claimed in this document.

Computing device 800 includes a processor 802, memory 804, a storage device 806, a high-speed interface 808 connecting to memory 804 and high-speed expansion ports 810, and a low speed interface 812 connecting to low speed bus 814 and storage device 806. Each of the components 802, 804, 806, 808, 810, and 812, are interconnected using various busses, and may be mounted on a common motherboard or in other manners as appropriate. The processor 802 can process instructions for execution within the computing device 800, including instructions stored in the memory 804 or on the storage device 806 to display graphical information for a GUI on an external input/output device, such as display 816 coupled to high speed interface 808. In other implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 804 stores information within the computing device 800. In one implementation, the memory 804 is a volatile memory unit or units. In another implementation, the memory 804 is a non-volatile memory unit or units. The memory 804 may also be another form of computer-readable medium, such as a magnetic or optical disk.

The storage device 806 is capable of providing mass storage for the computing device 800. In one implementation, the storage device 806 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 804, the storage device 806, or memory on processor 802.

The high speed controller 808 manages bandwidth-intensive operations for the computing device 800, while the low speed controller 812 manages lower bandwidth-intensive operations. Such allocation of functions is exemplary only. In one implementation, the high-speed controller 808 is coupled to memory 804, display 816 (e.g., through a graphics processor or accelerator), and to high-speed expansion ports 810, which may accept various expansion cards (not shown). In the implementation, low-speed controller 812 is coupled to storage device 806 and low-speed expansion port 814. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 820, or multiple times in a group of such servers. It may also be implemented as part of a rack server system 824. In addition, it may be implemented in a personal computer such as a laptop computer 822. Alternatively, components from computing device 800 may be combined with other components in a mobile device (not shown), such as device 850. Each of such devices may contain one or more of computing device 800, 850, and an entire system may be made up of multiple computing devices 800, 850 communicating with each other.

Computing device 850 includes a processor 852, memory 864, an input/output device such as a display 854, a communication interface 866, and a transceiver 868, among other components. The device 850 may also be provided with a storage device, such as a microdrive or other device, to provide additional storage. Each of the components 850, 852, 864, 854, 866, and 868, are interconnected using various buses, and several of the components may be mounted on a common motherboard or in other manners as appropriate.

The processor 852 can execute instructions within the computing device 850, including instructions stored in the memory 864. The processor may be implemented as a chipset of chips that include separate and multiple analog and digital processors. Additionally, the processor may be implemented using any of a number of architectures. For example, the processor 410 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 850, such as control of user interfaces, applications run by device 850, and wireless communication by device 850.

Processor 852 may communicate with a user through control interface 858 and display interface 856 coupled to a display 854. The display 854 may be, for example, a TFT (Thin-Film-Transistor Liquid Crystal Display) display or an OLED (Organic Light Emitting Diode) display, or other appropriate display technology. The display interface 856 may comprise appropriate circuitry for driving the display 854 to present graphical and other information to a user. The control interface 858 may receive commands from a user and convert them for submission to the processor 852. In addition, an external interface 862 may be provided in communication with processor 852, so as to enable near area communication of device 850 with other devices. External interface 862 may provide, for example, for wired communication in some implementations, or for wireless communication in other implementations, and multiple interfaces may also be used.

The memory 864 stores information within the computing device 850. The memory 864 can be implemented as one or more of a computer-readable medium or media, a volatile memory unit or units, or a non-volatile memory unit or units. Expansion memory 874 may also be provided and connected to device 850 through expansion interface 872, which may include, for example, a SIMM (Single In Line Memory Module) card interface. Such expansion memory 874 may provide extra storage space for device 850, or may also store applications or other information for device 850. Specifically, expansion memory 874 may include instructions to carry out or supplement the processes described above, and may include secure information also. Thus, for example, expansion memory 874 may be provided as a security module for device 850, and may be programmed with instructions that permit secure use of device 850. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 864, expansion memory 874, or memory on processor 852 that may be received, for example, over transceiver 868 or external interface 862.

Device 850 may communicate wirelessly through communication interface 866, which may include digital signal processing circuitry where necessary. Communication interface 866 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 868. In addition, short-range communication may occur, such as using a Bluetooth, WiFi, or other such transceiver (not shown). In addition, GPS (Global Positioning System) receiver module 870 may provide additional navigation- and location-related wireless data to device 850, which may be used as appropriate by applications running on device 850.

Device 850 may also communicate audibly using audio codec 860, which may receive spoken information from a user and convert it to usable digital information. Audio codec 860 may likewise generate audible sound for a user, such as through a speaker, e.g., in a handset of device 850. Such sound may include sound from voice telephone calls, may include recorded sound (e.g., voice messages, music files, etc.) and may also include sound generated by applications operating on device 850.

The computing device 850 may be implemented in a number of different forms, as shown in the figure. For example, it may be implemented as a cellular telephone 880. It may also be implemented as part of a smartphone 882, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. Accordingly, other embodiments are within the scope of the following claims.

What is claimed is:

1. A method of generating an attributed network for tracing transmitted data that is attributable to a user, the method comprising:
generating a digital registration certificate by packaging a biometric marker with a verified privity marker, the verified privity marker representing a human-witnessed affirmation of an identity of a user;
registering the digital registration certificate in a registry that comprises a block chain by generating an immutable entry in the block chain of the registry, with the generated immutable entry storing the digital registration certificate and representing initial registration of the digital registration certificate, with the immutable entry in the block chain storing the biometric marker and referencing the verified privity marker representing the human-witnessed affirmation of the identity of the user, and with retrieval of the digital registration certificate being required to access the attributed network;
receiving, from a client device, a request to access the attributed network, the request comprising biometric login data;
authenticating the user of the client device by verifying the biometric login data as matching the biometric marker included in the immutable entry in the registry;
responsive to authenticating, obtaining the digital registration certificate from the registry;
causing packaging, by a virtual browser configured for accessing the attributed network, of the digital registration certificate with user data generated by the user and specified by a client device of the user;
generating a new entry on the block chain in the registry, the new entry being linked to the immutable entry, the new entry indicating that the user data are attributed to the user by associating the user data with the privity marker representing the human-witnessed affirmation of the identity of the user;
following transmission of the user data packaged with the digital registration certificate by the virtual browser of the attributed network, receiving a request, from a device, to verify that the user data transmitted from the client device is attributable to the user, with the request including the digital registration certificate;
responsive to the request, retrieving, based on the digital registration certificate, the verified privity marker, representing the human-witnessed affirmation of the identity of the user, that is referenced by the new entry linked to the generated immutable entry; and
verifying, to the device, attribution of the verified privity marker to the user.

2. The method of claim 1, further comprising:
encrypting the packaged data; and
transmitting the encrypted, packaged data over the attributed network.

3. The method of claim 1, wherein the verified privity marker comprises the biometric marker, and wherein verification of the verified privity marker comprises notarization of the biometric marker.

4. The method of claim 1, wherein the virtual browser comprises an interface for accessing the attributed network, the interface configured to cause one or more processors of the client device to perform operations comprising:
verifying, in response to receiving data from one or more devices via the attributed network, a digital registration certificate associated with the data;
in response to a failed verification of the digital registration certificate associated with the data, preventing the data from being accessed by one or more systems of the client device;
in response to a successful verification of the digital registration certificate associated with the data, allowing the data to be accessed by the one or more systems of the client device.

5. The method of claim 1, further comprising:
receiving, from the client device, a request to access the attributed network, the request comprising system image data representing a status of the client device;
authenticating the client device by verifying the system image data as matching a verified system image included in an immutable entry in the registry;
responsive to authenticating the client device and the user, obtaining the digital registration certificate from the registry.

6. The method of claim 5, wherein the verified system image data includes data indicative of one or both of a pre-approved software configuration of the client device or a hardware configuration of the client device.

7. The method of claim 5, further comprising:
responsive to a failed authentication of the client device, causing the client device to revert to a pre-approved software configuration.

8. The method of claim 1, wherein the virtual browser is configured to package the digital registration certificate with data specified by a client device of the user at an application layer of a network protocol for transmission over the attributed network.

9. The method of claim 1, further comprising:
periodically requesting additional biometric data from the user to maintain access to the attributed network for the user; and
in response to receiving the additional biometric data from the user, updating the registry with an additional immutable entry in the block chain.

10. The method of claim 1, wherein the generated immutable entry storing the digital registration certificate comprises a timestamp and a cryptographic hash.

11. The method of claim 1, wherein the client device comprises an embedded biometric attribution system, and wherein the virtual browser is configured to verify a biometric identifier of the embedded biometric attribution system in response to receiving the request to access the attributed network.

12. The method of claim 11, wherein the embedded biometric attribution system comprises a SIM card, the SIM card being associated with the biometric identifier.

13. The method of claim 11, wherein the virtual browser verifies the biometric identifier of the embedded biometric attribution system independent of an operating system of the client device.

14. The method of claim 1, wherein the biometric data represents inherent biometric data of a user.

15. The method of claim 1, wherein the biometric data represents behavioral biometric data of the user.

16. The method of claim 1, wherein user includes an administrative user, and wherein the verified privity marker comprises a verification by another administrative user.

17. The method of claim 1, wherein user includes an administrative or otherwise privileged user, and verifying attribution of the verified privity marker to the user comprises increasing a threshold of verification before verifying the attribution using the increased threshold.

18. The method of claim 1, further comprising periodically requesting verification of biometric data of the user.

19. A system for generating an attributed network for tracing transmitted data that is attributable to a user, the system comprising:
one or more processing devices;
one or more machine-readable media configured to cause the one or more processing devices to perform operations comprising:
generating a digital registration certificate by packaging a biometric marker with a verified privity marker, the verified privity marker representing a human-witnessed affirmation of an identity of a user;
registering the digital registration certificate in a registry that comprises a block chain by generating an immutable entry in the block chain of the registry, with the generated immutable entry storing the digital registration certificate and representing initial registration of the digital registration certificate, with the immutable entry in the block chain storing the biometric marker and referencing the verified privity marker representing the human-witnessed affirmation of the identity of the user, and with retrieval of the digital registration certificate being required to access the attributed network;
receiving, from a client device, a request to access the attributed network, the request comprising biometric login data;
authenticating the user of the client device by verifying the biometric login data as matching the biometric marker included in the immutable entry in the registry;
responsive to authenticating, obtaining the digital registration certificate from the registry;
causing packaging, by a virtual browser configured for accessing the attributed network, of the digital registration certificate with user data generated by the user and specified by a client device of the user;
generating a new entry on the block chain in the registry, the new entry being linked to the immutable entry, the new entry indicating that the user data are attributed to the user by associating the user data with the privity marker representing the human-witnessed affirmation of the identity of the user;
following transmission of the user data packaged with the digital registration certificate by the virtual browser of the attributed network, receiving a request, from a device, to verify that the user data transmitted from the client device is attributable to the user, with the request including the digital registration certificate;
responsive to the request, retrieving, based on the digital registration certificate, the verified privity marker, representing the human-witnessed affirmation of the identity of the user, that is referenced by the new entry linked to the generated immutable entry; and
verifying, to the device, attribution of the verified privity marker to the user.

20. A non-transitory computer readable medium storing instructions that are executable by one or more processing devices configured to perform operations comprising:
generating, by the one or more processing devices, a digital registration certificate by packaging a biometric marker with a verified privity marker, the verified privity marker representing a human-witnessed affirmation of an identity of a user;
registering, by the one or more processing devices, the digital registration certificate in a registry that comprises a block chain by generating an immutable entry in the block chain of the registry, with the generated immutable entry storing the digital registration certificate and representing initial registration of the digital registration certificate, with the immutable entry in the block chain storing the biometric marker and referencing the verified privity marker representing the human-witnessed affirmation of the identity of the user, and with retrieval of the digital registration certificate being required to access the attributed network;
receiving, by the one or more processing devices from a client device, a request to access the attributed network, the request comprising biometric login data;
authenticating, by the one or more processing devices, the user of the client device by verifying the biometric login data as matching the biometric marker included in the immutable entry in the registry;

responsive to authenticating, obtaining, by the one or more processing devices, the digital registration certificate from the registry;

causing packaging, by a virtual browser configured for accessing the attributed network, of the digital registration certificate with user data generated by the user and specified by a client device of the user;

generating a new entry on the block chain in the registry, the new entry being linked to the immutable entry, the new entry indicating that the user data are attributed to the user by associating the user data with the privity marker representing the human-witnessed affirmation of the identity of the user;

following transmission of the user data packaged with the digital registration certificate by the virtual browser of the attributed network, receiving a request, from a device, to verify that the user data transmitted from the client device is attributable to the user, with the request including the digital registration certificate;

responsive to the request, retrieving, based on the digital registration certificate, the verified privity marker, representing the human-witnessed affirmation of the identity of the user, that is referenced by the new entry linked to the generated immutable entry; and verifying, to the device, attribution of the verified privity marker to the user.

* * * * *